(12) United States Patent
Nikazm et al.

(10) Patent No.: US 8,136,024 B2
(45) Date of Patent: Mar. 13, 2012

(54) OPTIONAL MEMORY ERROR CHECKING

(75) Inventors: Ayedin Nikazm, Austin, TX (US); William Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 981 days.

(21) Appl. No.: 12/115,645

(22) Filed: May 6, 2008

(65) Prior Publication Data

US 2009/0282321 A1 Nov. 12, 2009

(51) Int. Cl.
*G06F 11/00* (2006.01)
*G11C 29/00* (2006.01)

(52) U.S. Cl. ........................................ 714/799; 714/718
(58) Field of Classification Search .................. 714/799, 714/718, 703, 742, 746
See application file for complete search history.

(56) References Cited

U.S. PATENT DOCUMENTS

| | | | |
|---|---|---|---|
| 4,145,740 A | 3/1979 | McClean et al. | |
| 5,848,224 A | 12/1998 | Nhu | |
| 5,910,740 A | 6/1999 | Underwood | |
| 6,223,309 B1 * | 4/2001 | Dixon et al. | 714/703 |
| 7,085,967 B2 | 8/2006 | Elfering et al. | |
| 2004/0153902 A1 | 8/2004 | Machado et al. | |
| 2004/0163019 A1 | 8/2004 | Elfering et al. | |

OTHER PUBLICATIONS www.altera.com/products/ip/iup/memory/m-nwl-mobile-ddr-sdram.html; 3 pages.

* cited by examiner

*Primary Examiner* — Phung M Chung
(74) *Attorney, Agent, or Firm* — Haynes and Boone, LLP

(57) ABSTRACT

A memory error checking system includes a controller that is operable to transmit memory signals and error check signals. A first memory device coupler is coupled to the controller and operable to couple to a first memory device. The first memory device coupler is operable to transmit the memory signals from the controller to the first memory device. A first error check device coupler is coupled to the contoller and operable to couple to a first error check device that is separate from the first memory device. The first error check device coupler is operable to transmit the error check signals from the controller to the first error check device to be used to error check the memory signals transmitted to the first memory device.

20 Claims, 19 Drawing Sheets

OPTIONAL MEMORY ERROR CHECKING

BACKGROUND

The present disclosure relates generally to information handling systems, and more particularly to optional memory error checking for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs include Error Correction Code/Error Checking and Correction (ECC) mechanisms that are used to detect and/or correct memory errors. For example, in single-bit error correction, ECC mechanisms may generate a check-byte for data sent across the memory bus by calculating that byte of data using an ECC algorithm. The check-byte is then used to check if the data is correct and, if the data is not correct, to correct the single-bit error. The check-byte is transferred together with the original data, so the bus for memory devices with ECC mechanisms are typically 72-bit wide as opposed to 64-bit wide for memory devices without ECC mechanisms. Enabling such ECC mechanisms for some IHSs can raise a number of issues due to, for example, the larger sized buses needed to enable ECC mechanisms.

Some conventional desktop IHSs include a memory coupler that is operable to couple a memory device to the IHS. The memory coupler typically includes enough connections to transmit memory signals and error check signals between a memory device and the IHS. A user of the conventional desktop IHS may then couple either a memory device with an ECC mechanism or a memory device without an ECC mechanism, both of which are sized to be coupled to the memory coupler, to the memory coupler depending on whether or not error checking and/or correction is needed for that conventional desktop IHS. However, for portable/mobile IHSs, space limitations in the IHS may limit the ability to provide for error checking and/or correction.

For example, some portable/mobile IHSs include memory couplers for memory devices such as, for example, Small Outline Dual Inline Memory Modules (SODIMMs) and/or other non-ECC enabled memory devices known in the art. The standard SODIMM couplers on portable/mobile IHSs do not provide support for ECC mechanisms or include the required connections to transmit signals for error checking and/or correction. In order to provide for error checking and/or correction, small module standards that include ECC mechanisms such as, for example, mini-DIMMs, may be provided, but these require larger memory couplers that will only couple mini-DIMMs to the IHS, which raises costs and limits manufacturing and after-manufacture flexibility to the use of only those ECC-enabled memory devices.

Accordingly, it would be desirable to provide memory error checking for an IHS absent the disadvantages discussed above.

SUMMARY

According to one embodiment, a memory error checking system includes a controller that is operable to transmit memory signals and error check signals, a first memory device coupler that is coupled to the controller and operable to couple to a first memory device, wherein the first memory device coupler is operable to transmit the memory signals from the controller to the first memory device, and a first error check device coupler that is coupled to the controller and operable to couple to a first error check device that is separate from the first memory device, wherein the first error check device coupler is operable to transmit the error check signals from the controller to the first error check device to be used to error check the memory signals transmitted to the first memory device.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
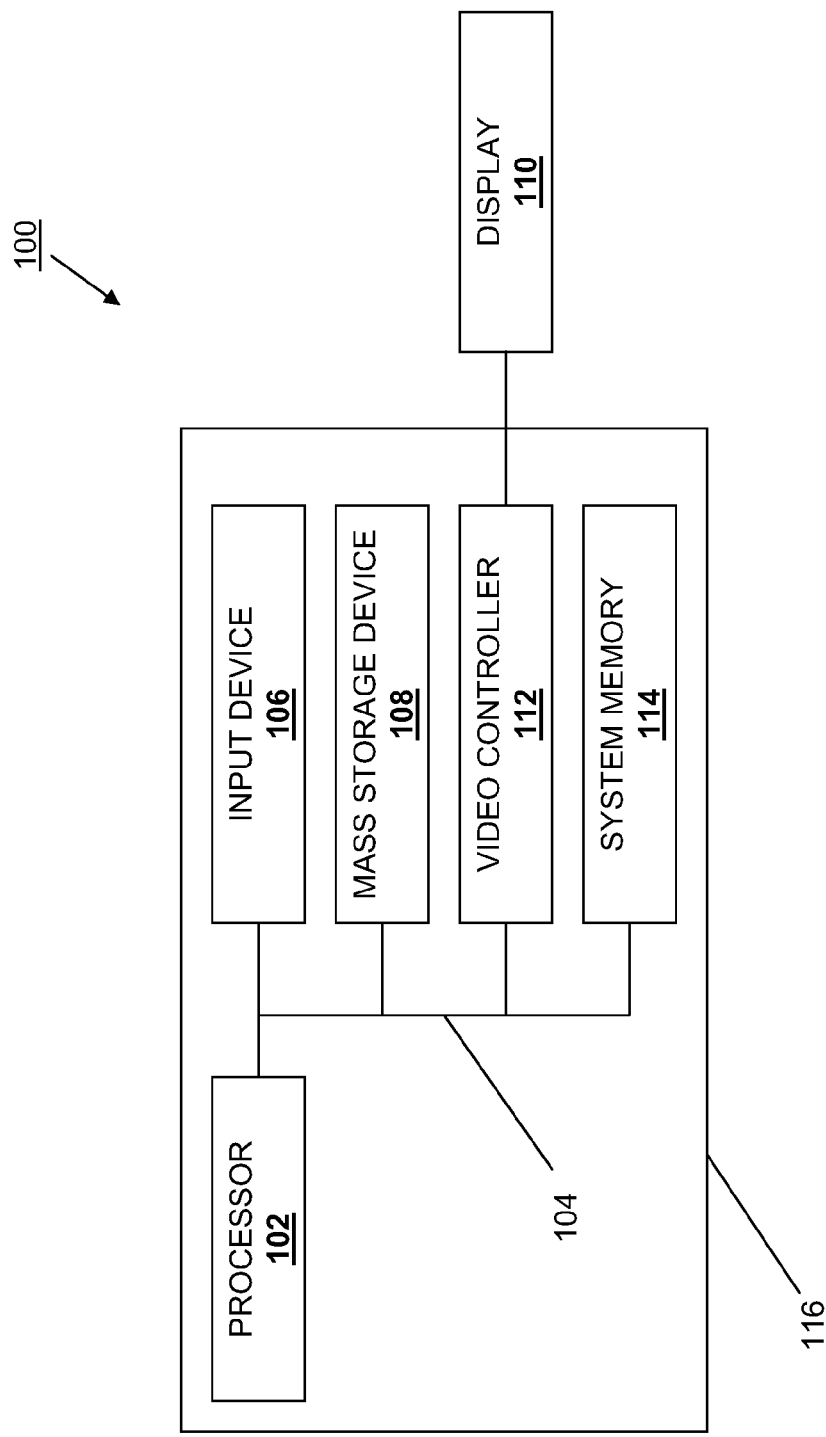
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
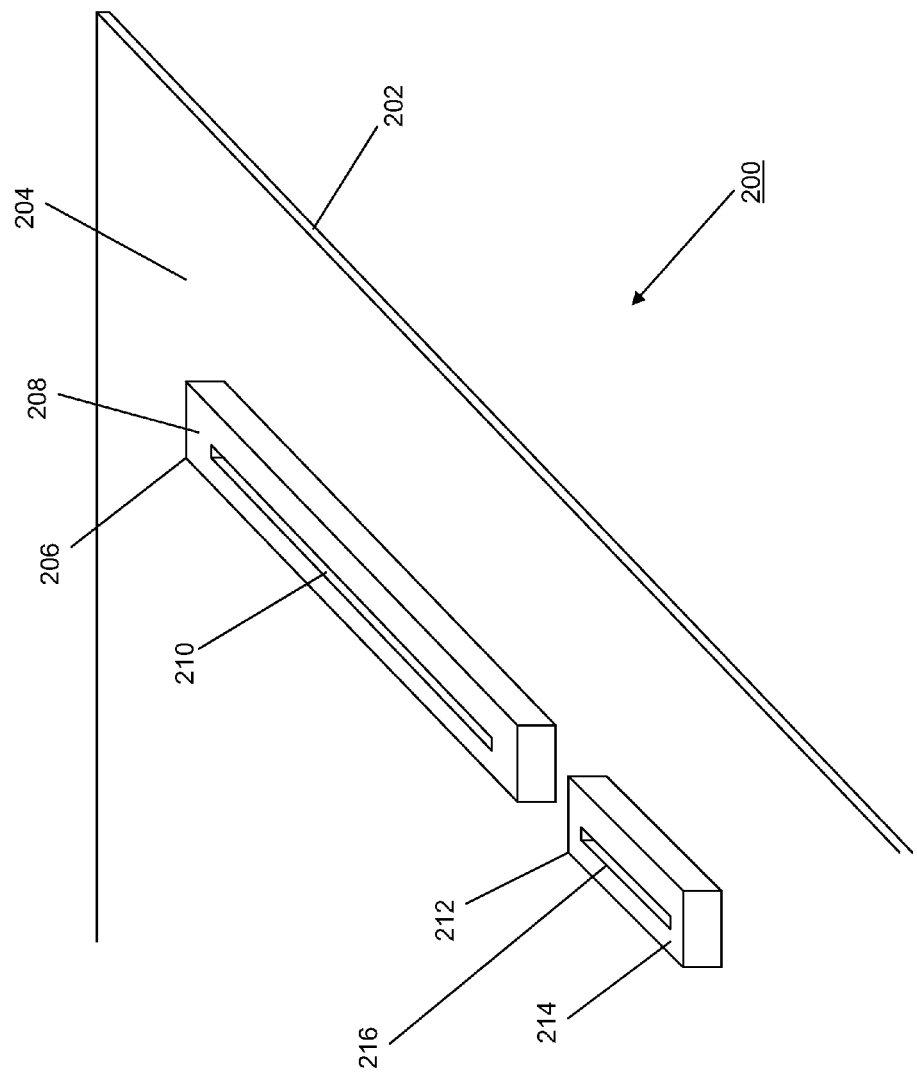
FIG. 2*a* is a perspective view illustrating an embodiment of an IHS.
Figure 2B:
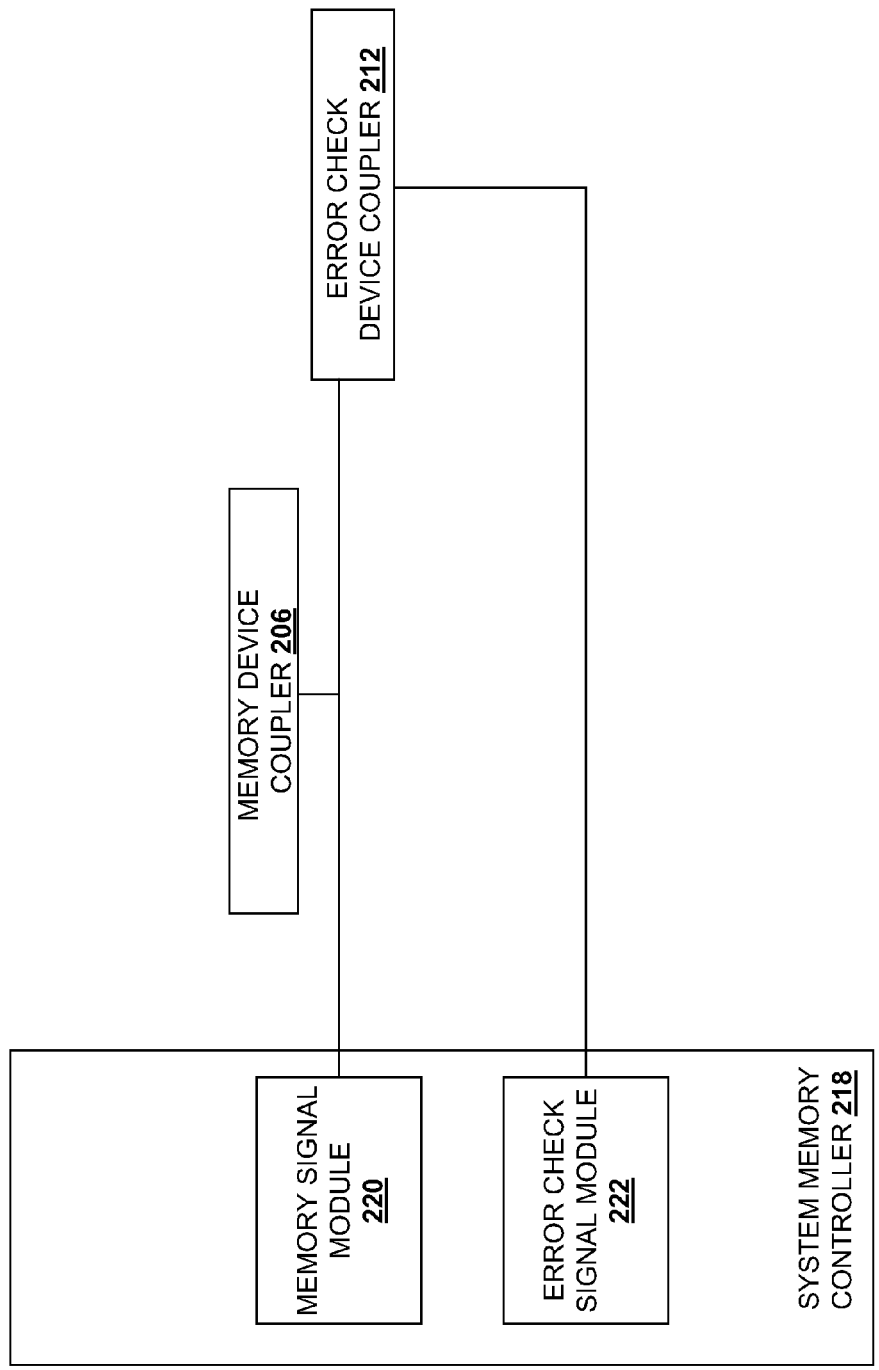
FIG. 2*b* is a schematic view illustrating an embodiment of the IHS of FIG. 2*a*.

Referring now to FIGS. 2a and 2b, an IHS 200 is illustrated. In an embodiment, the IHS 200 may be part of the IHS 100, described above with reference to FIG. 1. In an embodiment, the IHS 200 may be part of a portable/mobile IHS that includes space limitations that, for example, result in the use of memory devices with a small form factor relative to those used in a conventional desktop IHS. The IHS 200 includes a board 202 having a top surface 204. In an embodiment, the board 202 is housed in a chassis such as, for example, the chassis 116 described above with reference to FIG. 1. A memory device coupler 206 having a top surface 208 is mounted to the board 202. A memory device mating slot 210 is defined by the memory device coupler 206 and extends from the top surface 208 of the memory device coupler 206 and into the memory device coupler 206. The memory device coupler 206 includes a plurality of connections (not shown) that are located in the memory device mating slot 210 and may be coupled through the board 202 to a processor such as, for example, the processor 102 described above with reference to FIG. 1. While the memory device coupler 206 is illustrated as a vertical connector, one of skill in the art will recognize that other types of connectors will fall within the scope of the present disclosure including, for example, right-angle connectors used with SODIMMs and/or a variety of other connectors known in the art. An error check device coupler 212 having a top surface 214 is mounted to the board 202. An error check device mating slot 216 is defined by the error check device coupler 212 and extends from the top surface 214 of the error check device coupler 212 and into the error check device coupler 212. The error check device coupler 212 includes a plurality of connections that are located in the error check device mating slot 216 and may be coupled through the board 202 to a processor such as, for example, the processor 102 described above with reference to FIG. 1. In the embodiment illustrated in FIG. 2a, the memory device coupler 206 and the error check device coupler 212 are physically separate connectors on the board 202. However, in an embodiment, the memory device coupler 206 and the error check device coupler 212 may be part of one physical connector that defines each of a separate memory device mating slot that is substantially similar to the memory device mating slot 210 and a separate error check device mating slot that is substantially similar to the error check device mating slot 216. The IHS 200 also includes a system memory controller 218 that may be, for example, located on the board 202, located on the processor 102 that is described above with reference to FIG. 1, and/or located in a variety of other locations known in the art. The system memory controller 218 includes a memory signal module 220 that is operable to transmit, for example, shared memory signals, address signals, clock signals, control signals, and/or a variety of other memory signals known in the art. The memory signal module 220 is coupled to the memory device coupler 206 and the error check device coupler 212 through, for example, the board 202. The system memory controller 218 also includes an error check signal module 222 that is operable to transmit, for example, ECC memory signals, ECC data signals, control signals, and a variety of other error check signals known in the art. The error check signal module 222 is coupled to the error check device coupler 212 through, for example, the board 202. In the embodiment illustrated in FIG. 2b, the memory device coupler 206 and the error check device coupler 212 are coupled to each other through, for example, the board 202.

Figure 2C:
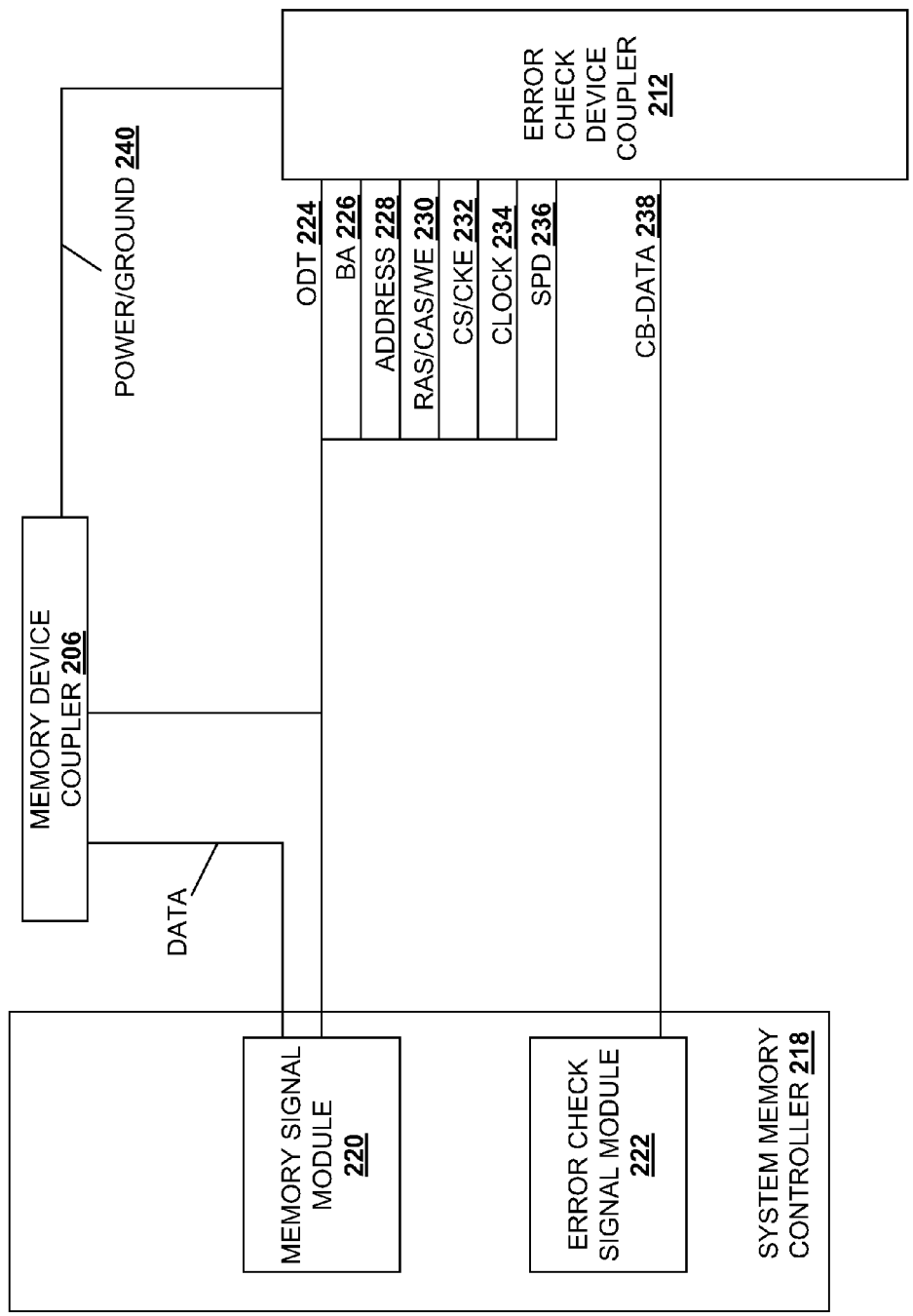
FIGS. 2*c* and 2*d* are schematic views illustrating embodiments of the IHS of FIGS. 2*a* and 2*b*.
Figure 2D:
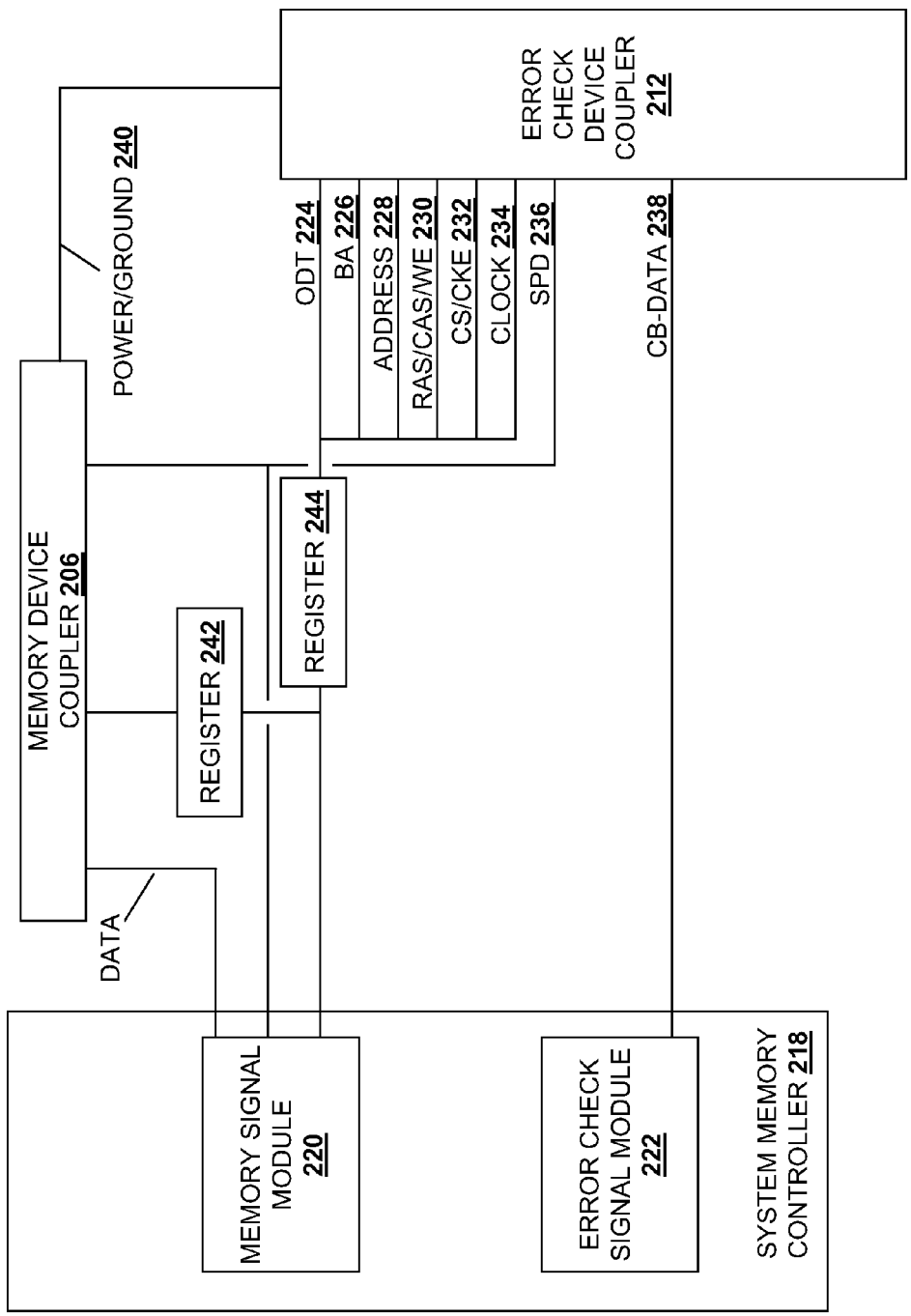

Referring now to FIGS. 2c and 2d, in an embodiment, the error check device coupler 212 includes an On-Die Termination (ODT) 224, a Bank Address (BA) 226, an address 228, Row Address Strobe/Column Address Strobe/Write Enable (RAS/CAS/WE) 230, a Chip Select/Clock Enable (CS/CKE) 232, a clock 234, a Serial Presence Detect (SPD) 236, and a Check Byte (CB) data 238. The memory signal module 220 of the system memory controller 218 may be coupled to the ODT 224, the BA 226, the address 228, the RAS/CAS/WE 230, the CS/CKE 232, the clock 234, and the SPD 236 of the error check device coupler 212 while also having a data coupling to the memory device coupler 206. The error check signal module 222 of the system memory controller 218 may be coupled to the CB data 238 of the error check device coupler 212. The memory device coupler 206 and the error check device coupler 212 may also be coupled to a power/ground 240. In an embodiment, some DRAM interfaces may require buffers to maintain signal quality, and standard components from, for example, Registered Dual Inline Memory Modules (RDIMMs) may be adapted for this purpose. For example, a plurality of registers 242 and 244 may be coupled between the memory signal module 220, the memory device coupler 206, and the error check device coupler 212, and a coupling may be provided between the SPD 236 and the memory device coupler 206 and the memory signal module 220, as illustrated in FIG. 2d.

Figure 3:
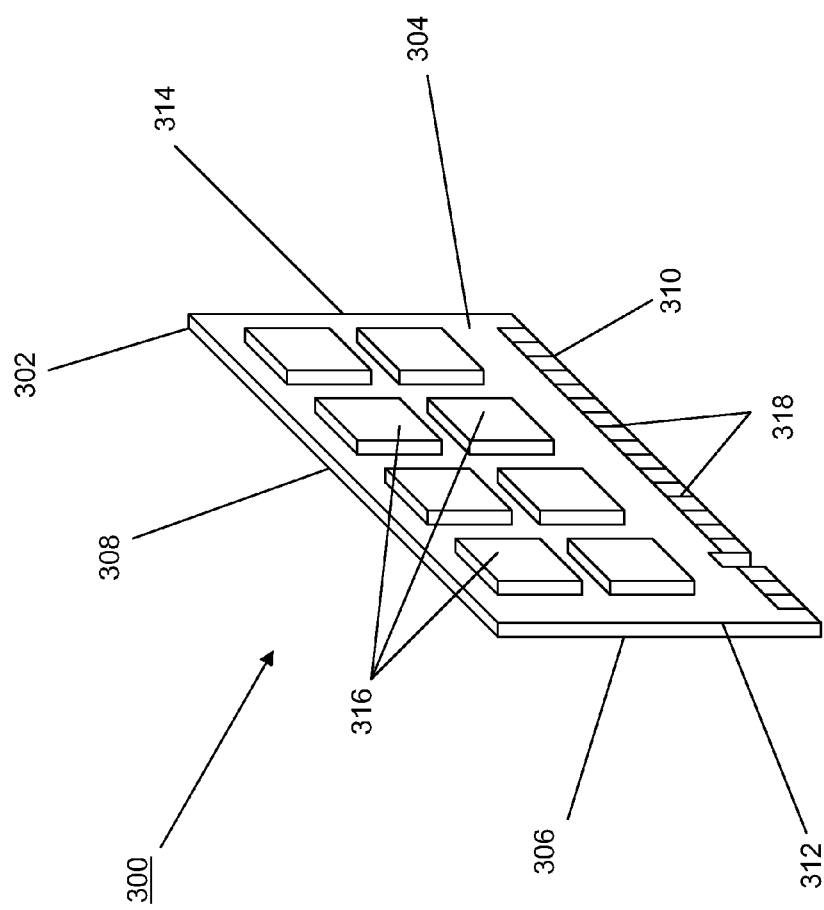
FIG. 3 is a perspective view illustrating an embodiment of a memory device used with the IHS of FIGS. 2*a*, 2*b*, 2*c* and 2*d*.

Referring now to FIG. 3, a memory device 300 is illustrated. In an embodiment, the memory device 300 may be, for example, a SODIMM and/or a variety of other non-ECC enabled memory devices known in the art. The memory device 300 includes a base 302 having a front surface 304, a rear surface 306 located opposite the front surface 304, a top edge 308 extending between the front surface 304 and the rear surface 306, a bottom edge 310 located opposite the top edge 308 and extending between the front surface 304 and the rear surface 306, and a pair of opposing side edges 312 and 314 extending between the front surface 304, the rear surface 306, the top edge 308, and the bottom edge 310. In an embodiment, the base 302 may be a circuit board known in the art. In an embodiment, the memory device 300 includes a plurality of chips 316 located on the front surface 304 and/or the rear surface 306 (not illustrated). A plurality of memory device contacts 318 are located on the front surface 304, the bottom edge 310, and/or the rear surface 306 of the base 302 and are electrically coupled to the chips 316 through the base 302. In an embodiment, the memory device 300 includes other components (not illustrated) for enabling memory operations that are known in the art.

Figure 4:
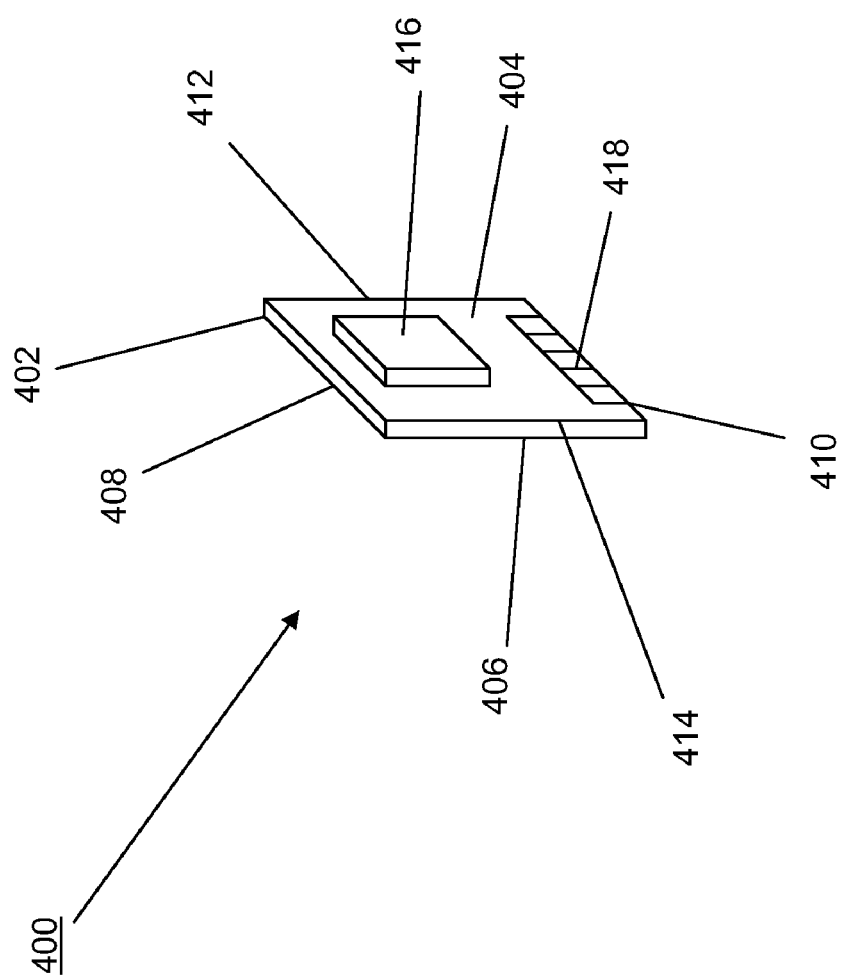
FIG. 4 is a perspective view illustrating an embodiment of an error check device used with the IHS of FIGS. 2*a*, 2*b*, 2*c* and 2*d*.

Referring now to FIG. 4, an error check device 400 is illustrated. The error check device 400 includes a base 402 having a front surface 404, a rear surface 406 located opposite the front surface 404, a top edge 408 extending between the front surface 404 and the rear surface 406, a bottom edge 410 located opposite the top edge 408 and extending between the front surface 404 and the rear surface 406, and a pair of opposing side edges 412 and 414 extending between the front surface 404, the rear surface 406, the top edge 408, and the bottom edge 410. In an embodiment, the base 402 may be a circuit board known in the art. In an embodiment, the error check device 400 includes a chip 416 located on the front surface 404 and/or the rear surface 406 (not illustrated). A plurality of error check device contacts 418 are located on the front surface 404, the bottom edge 410, and/or the rear surface 406 of the base 402 and are electrically coupled to the chip(s) 416 through the base 402. In an embodiment, the error check device 400 includes other components (not illustrated) for enabling error checking operations that are known in the art.

Referring now to FIGS. 2a, 2b, 3, 4, 5a, 5c and 5d, a method 500 for memory error checking is illustrated. The method 500 begins at block 502 where a memory device coupler and an error check device coupler are provided. In an embodiment, the IHS 200 is provided that includes the memory device coupler 206 and the error check device coupler 212. The method 500 then proceeds to block 504 where a memory device is coupled to the memory device coupler. In an embodiment, the memory device 300 is positioned adjacent the memory device coupler 206 such that the bottom edge 310 of the memory device 300 is located adjacent the memory device mating slot 210 on the memory device coupler 206. The memory device 300 is then moved towards the memory device coupler 206 such that the bottom edge 210 of the memory device 300 enters the memory device mating slot 210 and the plurality of memory device contacts 318 engage the plurality of connections (not shown) located in the memory device mating slot 210, coupling the memory device 300 to the memory device coupler 206. In an embodiment, the memory device coupler 206 and the memory device 300 include features that ensure the correct coupling (e.g., in the correct orientation and direction) of the memory device 300 to the memory device coupler 206. The method 500 then proceeds to block 506 where an error check device is coupled to the error check device coupler. In an embodiment, the error check device 400 is positioned adjacent the error check device coupler 212 such that the bottom edge 410 of the error check device 400 is located adjacent the error check device mating slot 216 on the error check device coupler 212. The error check device 400 is then moved towards the error check device coupler 212 such that the bottom edge 410 of the error check device 400 enters the error check device mating slot 216 and the plurality of error check device contacts 418 engage the plurality of connections (not shown) located in the error check device mating slot 410, coupling the error check device 400 to the error check device coupler 212. In an embodiment, the error check device coupler 212 and the error check device 400 include features that ensure the correct coupling (e.g., in the correct orientation and direction) of the error check device 400 to the error check device coupler 212.

The method 500 then proceeds to block 508 where memory check signals transmitted to the memory device are error checked. In an embodiment, the system memory controller 218 transmits memory signals (e.g., data bytes) from the memory signal module 220 to the memory device 300 through the memory device coupler 206. Along with those memory signals, the system memory controller 218 generates error check signals (e.g., a check-byte based on the data bytes) using the error check signal module 222 and transmits those error check signals to the error check device 400 through the error check device coupler 212. The system controller 218 may then read the error check signals and the memory signals and correct errors in the memory signals if they are present. For example, in an embodiment using single-bit error checking and correction, the error check signals include check-bits and the memory signals includes bytes of data. A check-byte is transmitted to the error check device 400 when data is transmitted to the memory device 300, and the check-byte and data are later read by the system controller 218 allowing the system memory controller 218 to determine whether or not the data transmitted to the memory device 300 is correct. In an embodiment, if the data transmitted to the memory device 300 is not correct, the system memory controller 218 is operable to correct the error.

Figure 5A:
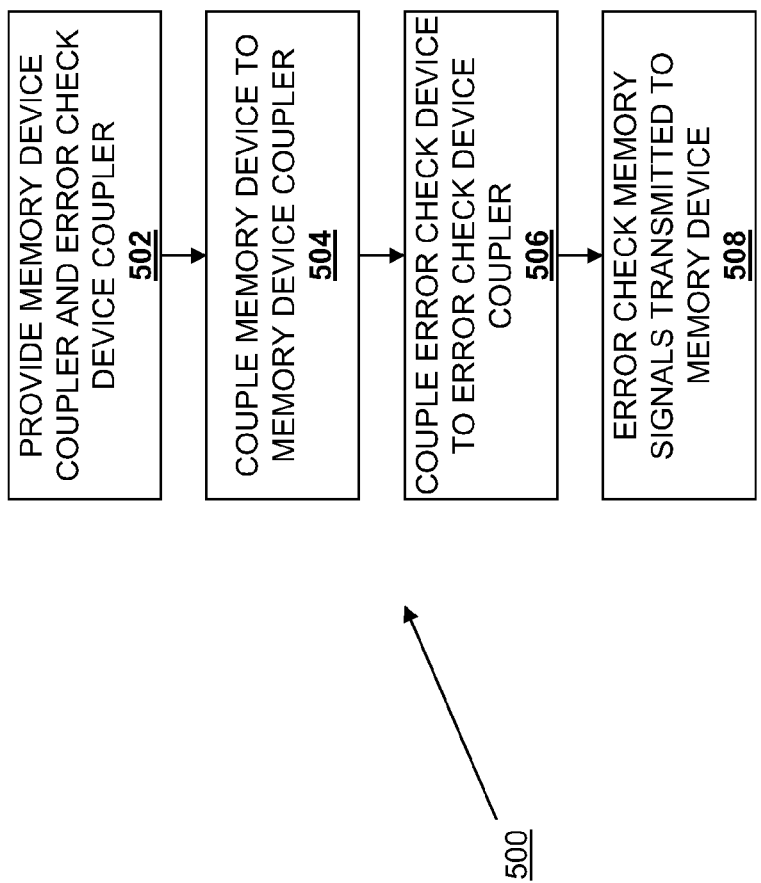
FIG. 5*a* is a flow chart illustrating an embodiment of a method for memory error checking.
Figure 5B:
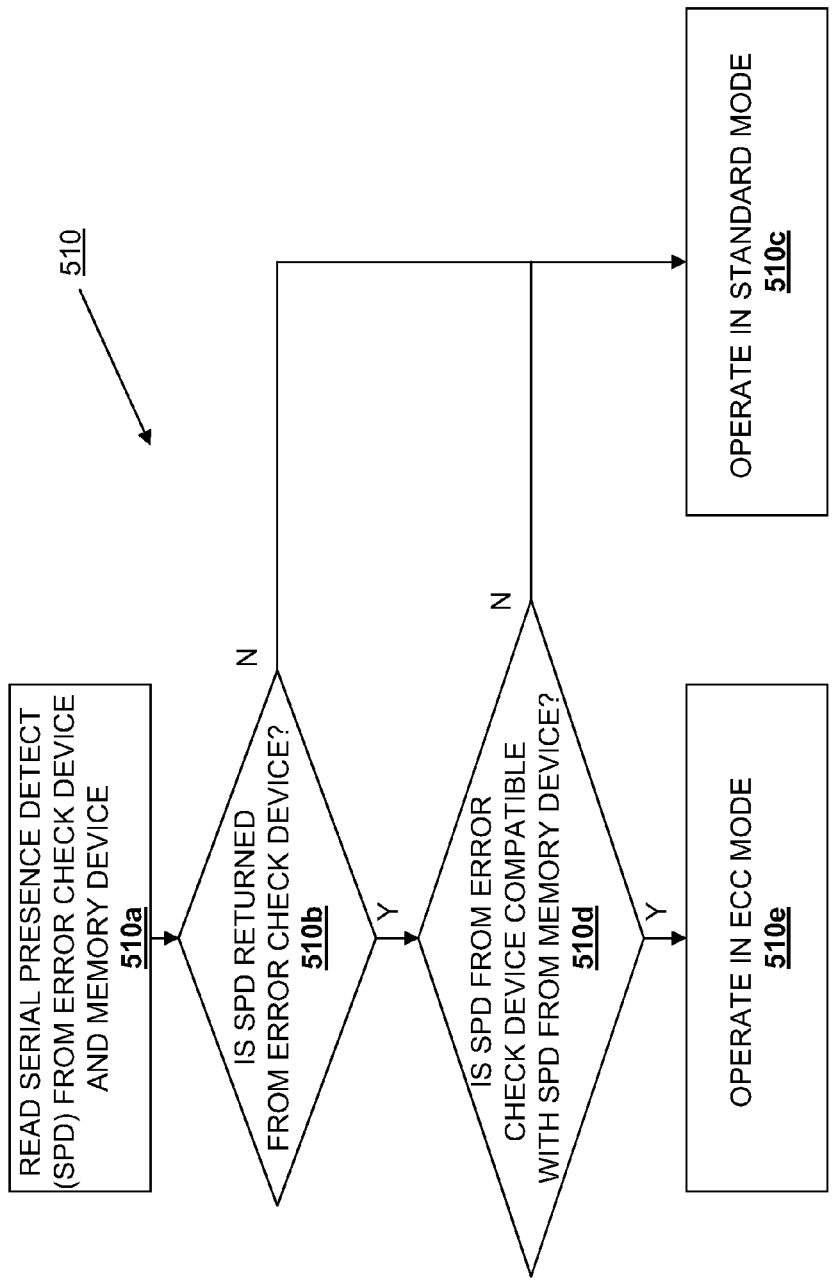
FIG. 5*b* is a flow chart illustrating an embodiment of a method for determining a mode of operation of an IHS.
Figure 5C:
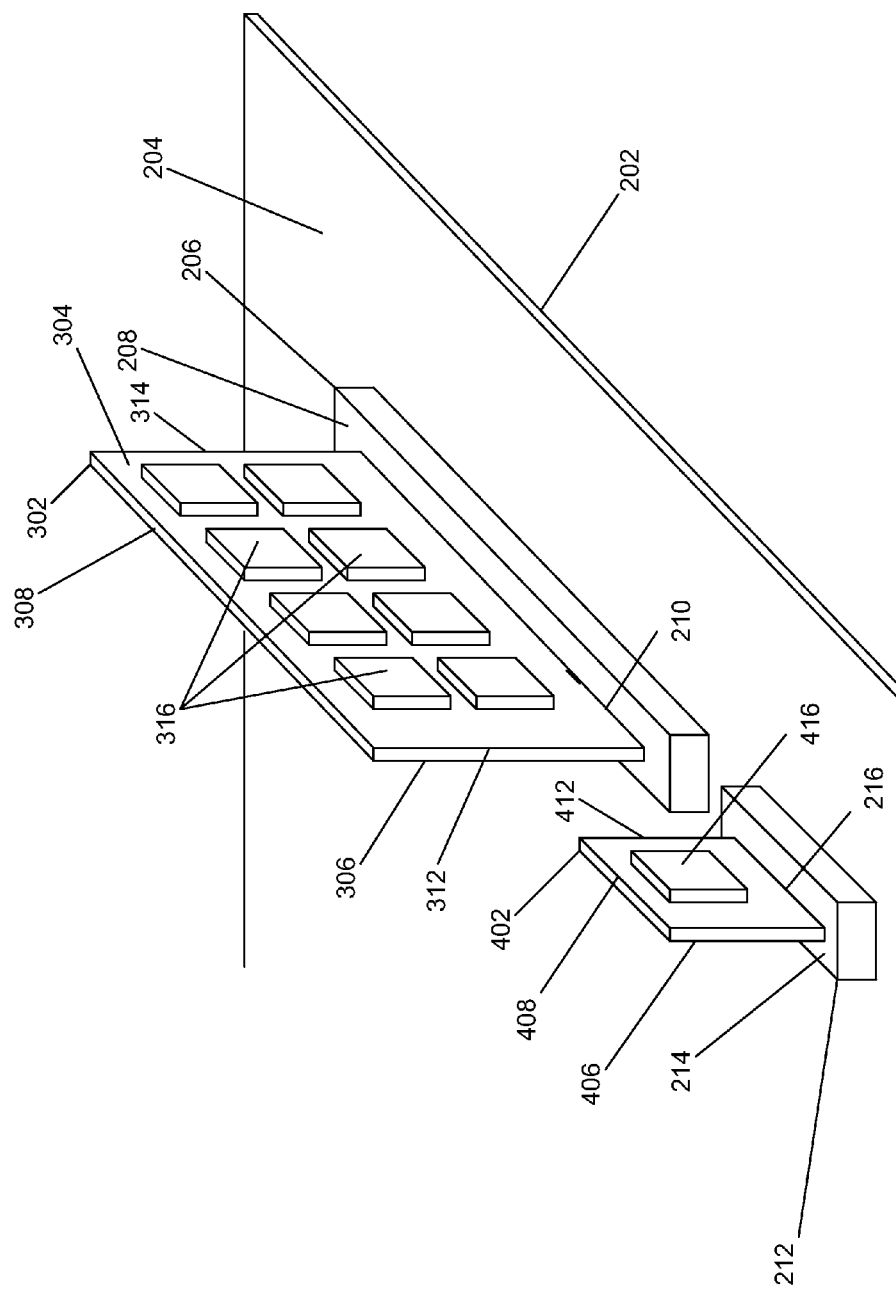
FIG. 5*c* is a perspective view illustrating an embodiment of the memory device of FIG. 3 and the error check device of FIG. 4 coupled to the IHS of FIG. 2*a*.
Figure 5D:
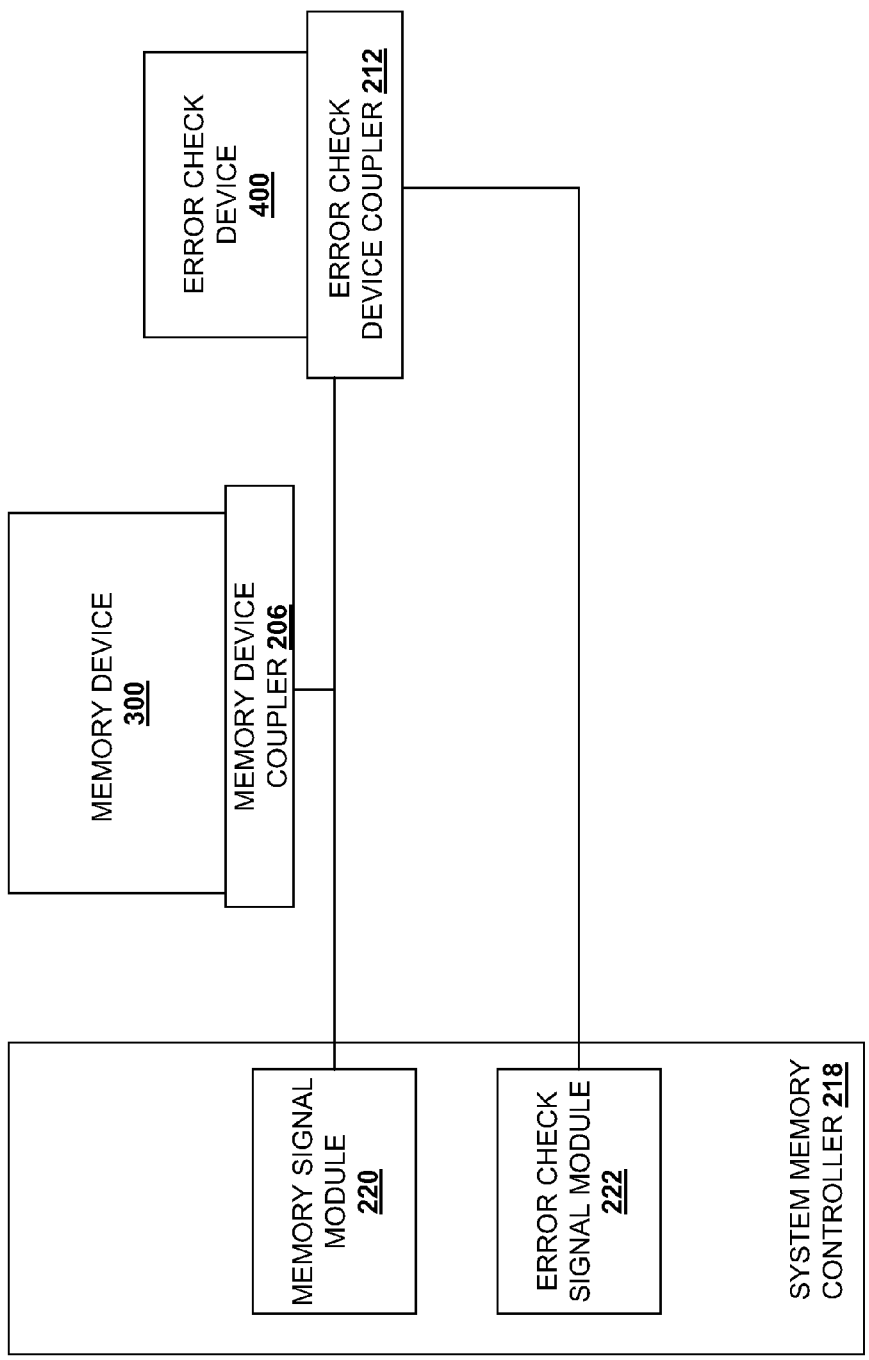
FIG. 5*d* is a schematic view illustrating an embodiment of the memory device of FIG. 3 and the error check device of FIG. 4 coupled to the IHS of FIG. 2*b*.
Figure 6A:
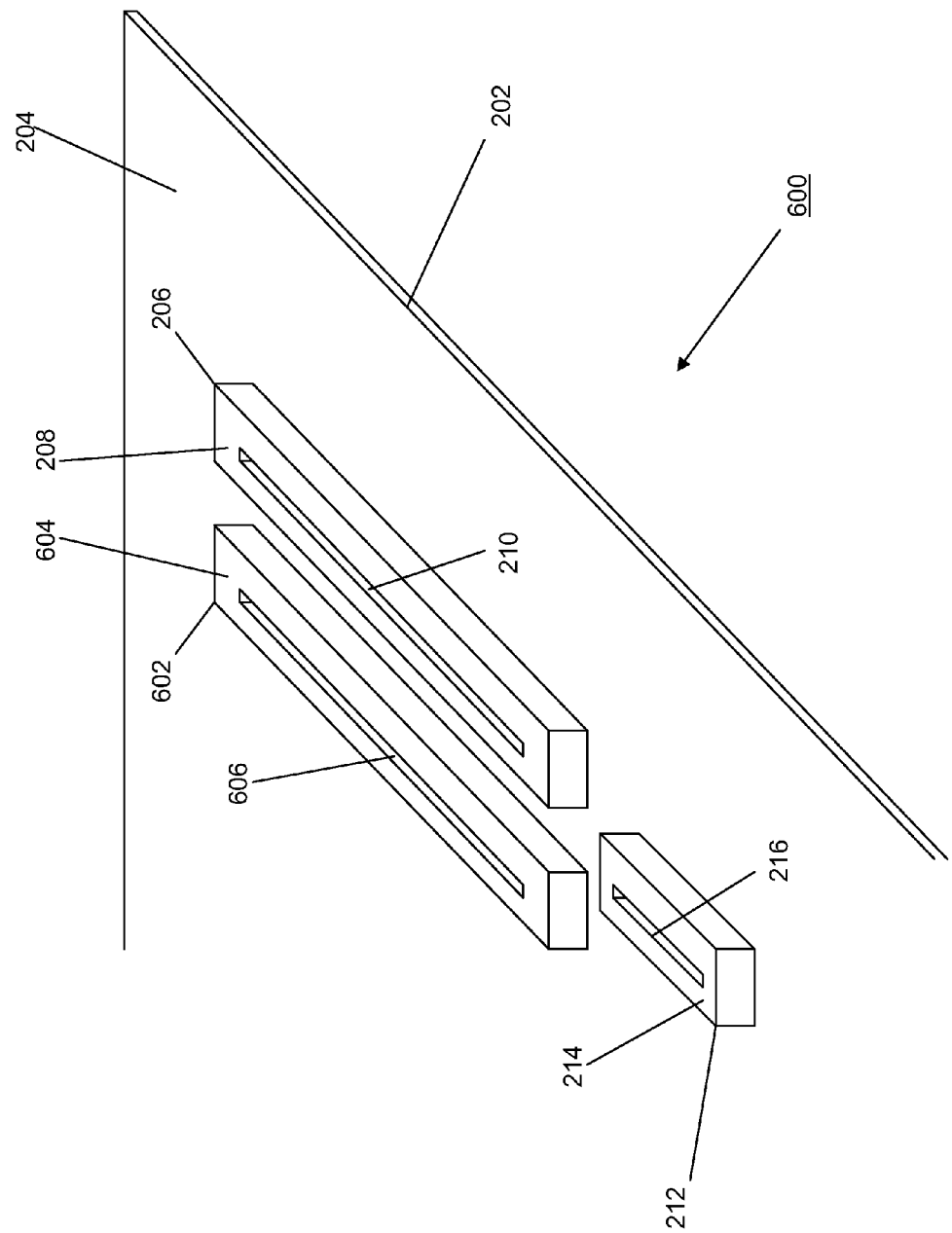
FIG. 6*a* is a perspective view illustrating an embodiment of an IHS.
Figure 6B:
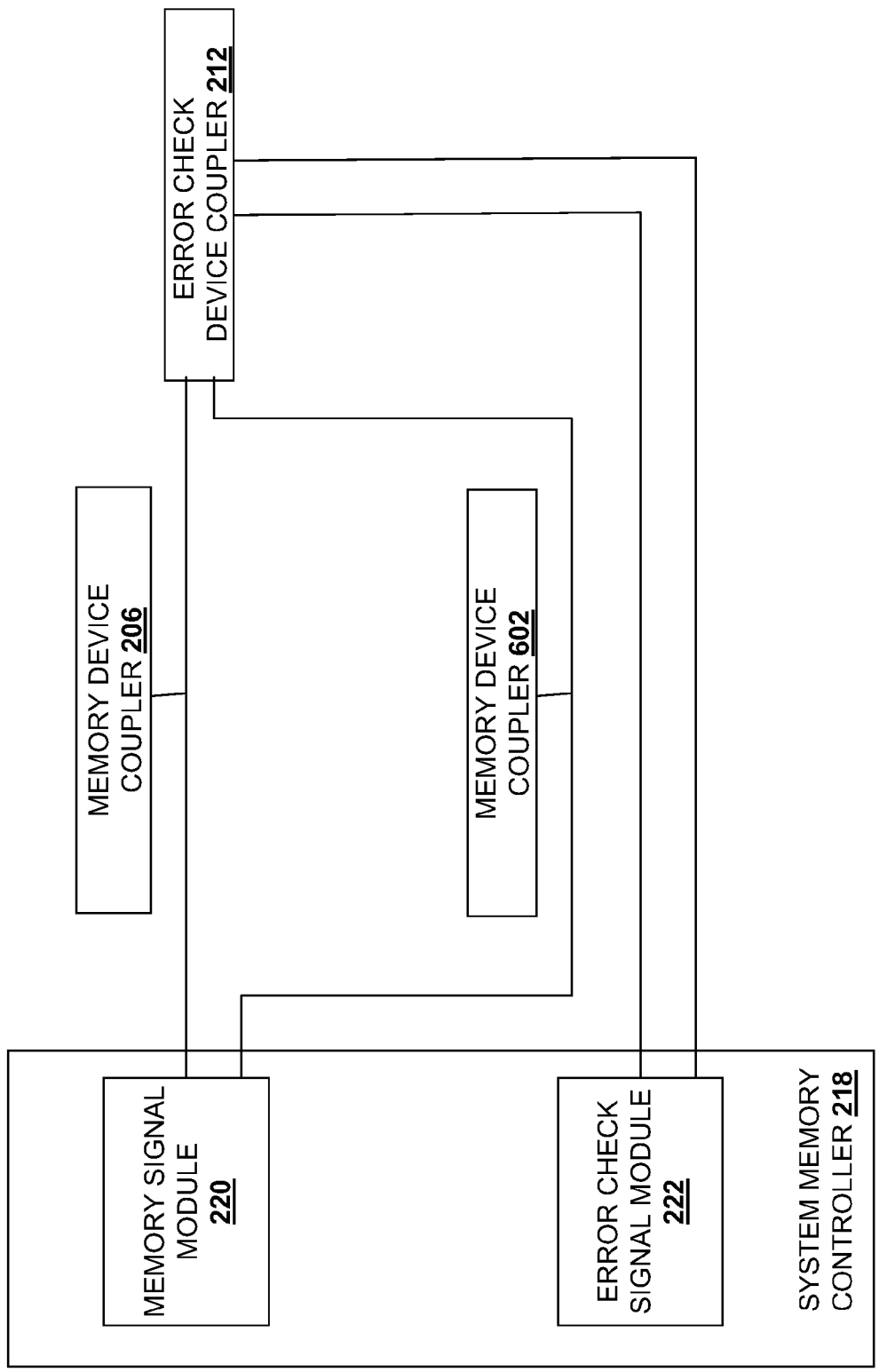
FIG. 6*b* is a schematic view illustrating an embodiment of the IHS of FIG. 6*a*.
Figure 6C:
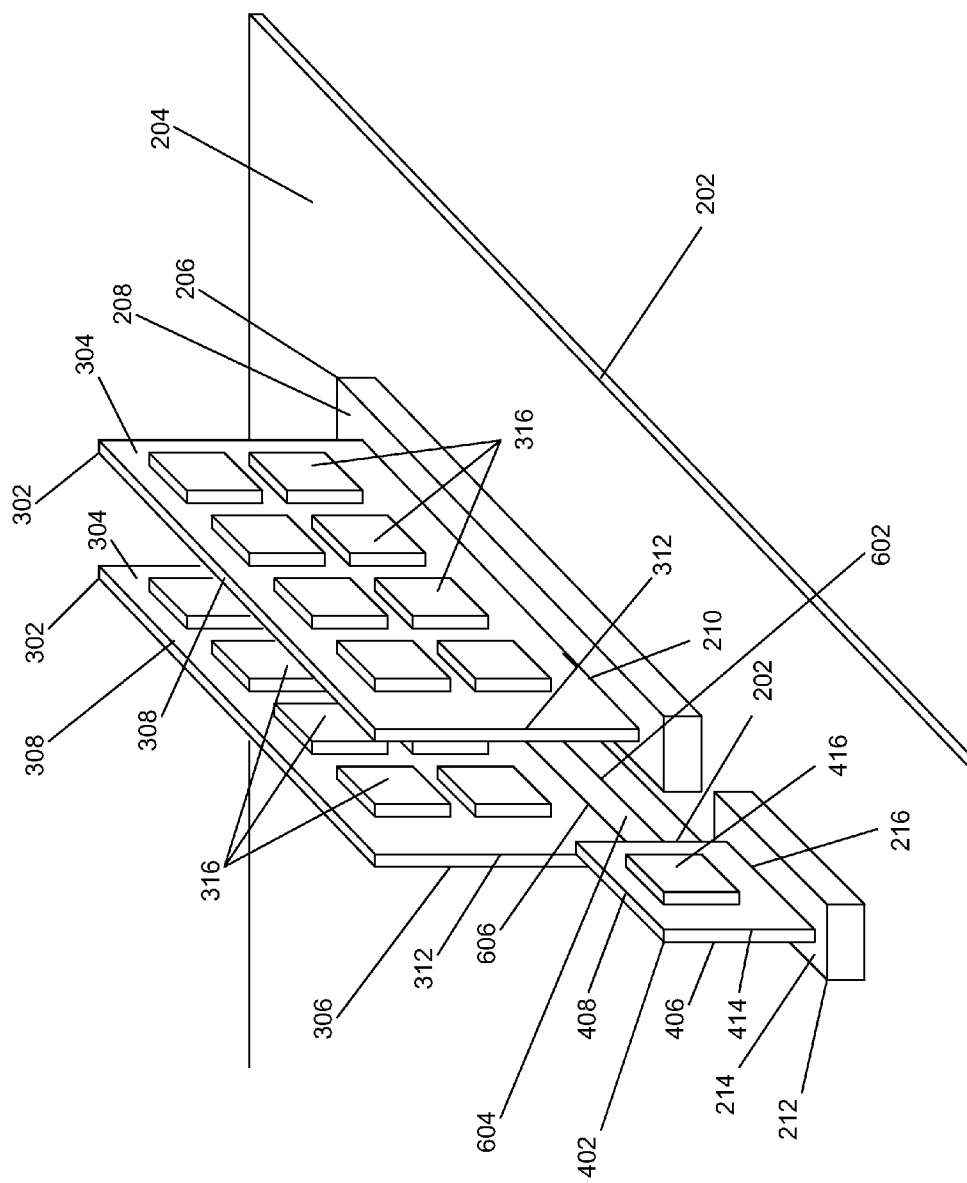
FIG. 6*c* is a perspective view illustrating an embodiment of the memory device of FIG. 3 and the error check device of FIG. 4 coupled to the IHS of FIG. 6*a*.
Figure 6D:
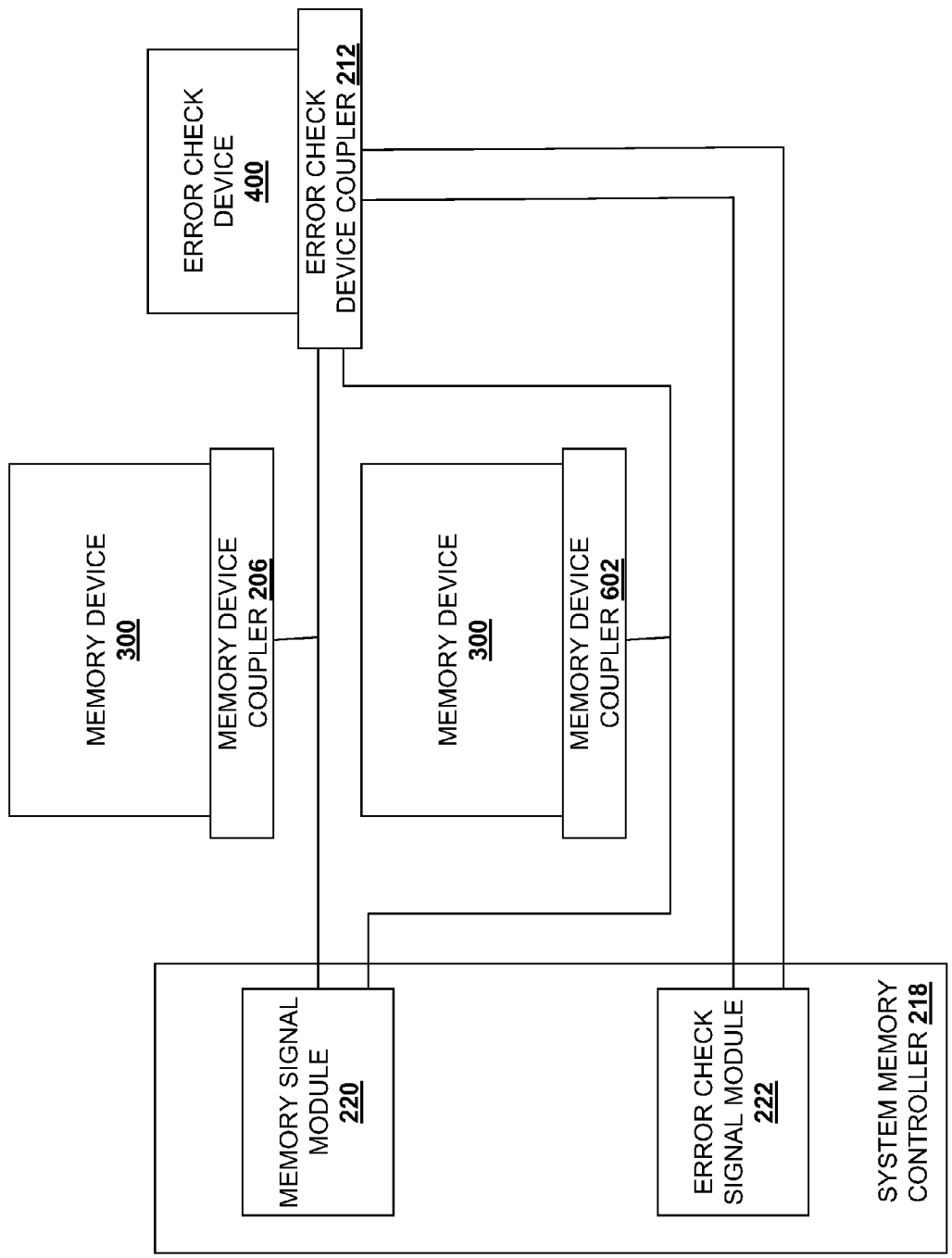
FIG. 6*d* is a schematic view illustrating an embodiment of the memory device of FIG. 3 and the error check device of FIG. 4 coupled to the IHS of FIG. 6*b*.
Figure 7A:
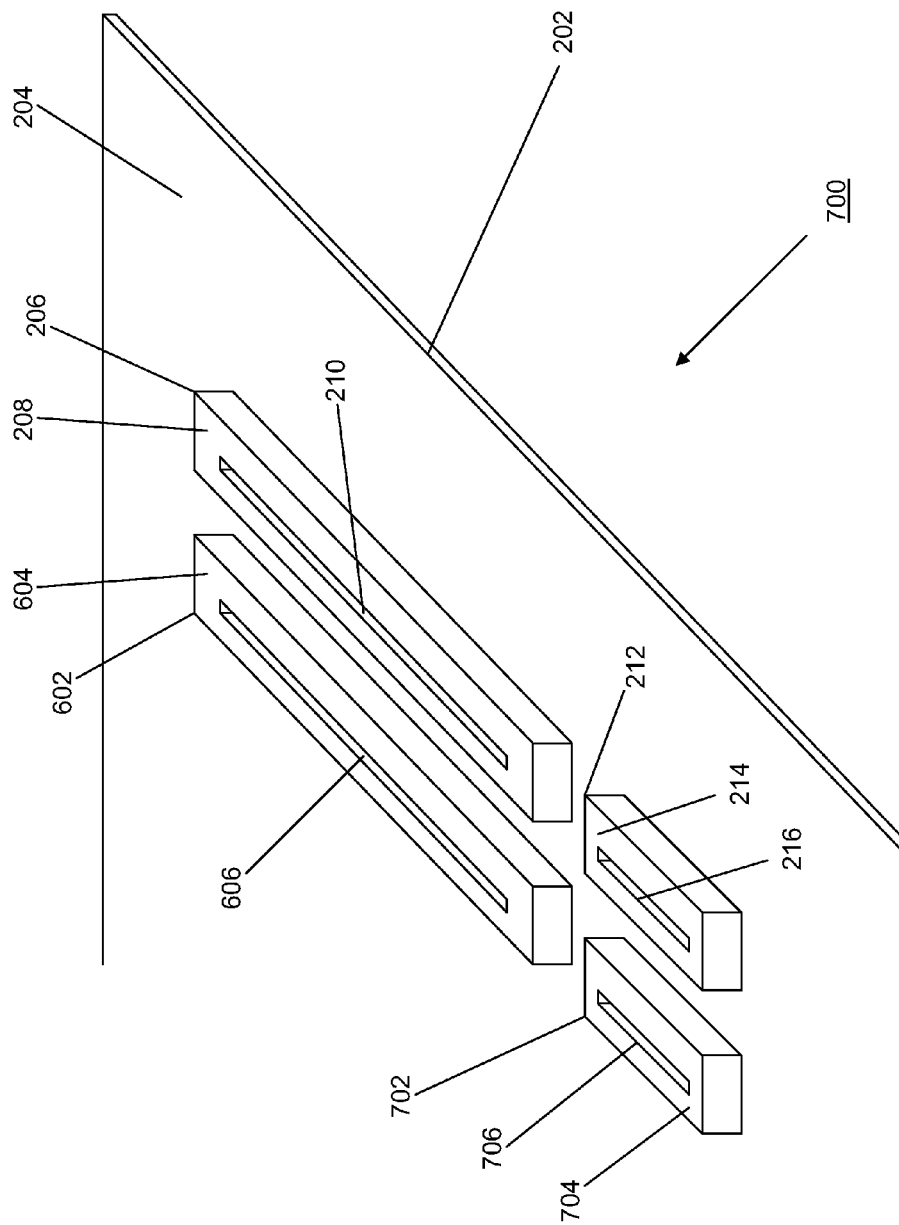
FIG. 7*a* is a perspective view illustrating an embodiment of an IHS.
Figure 7B:
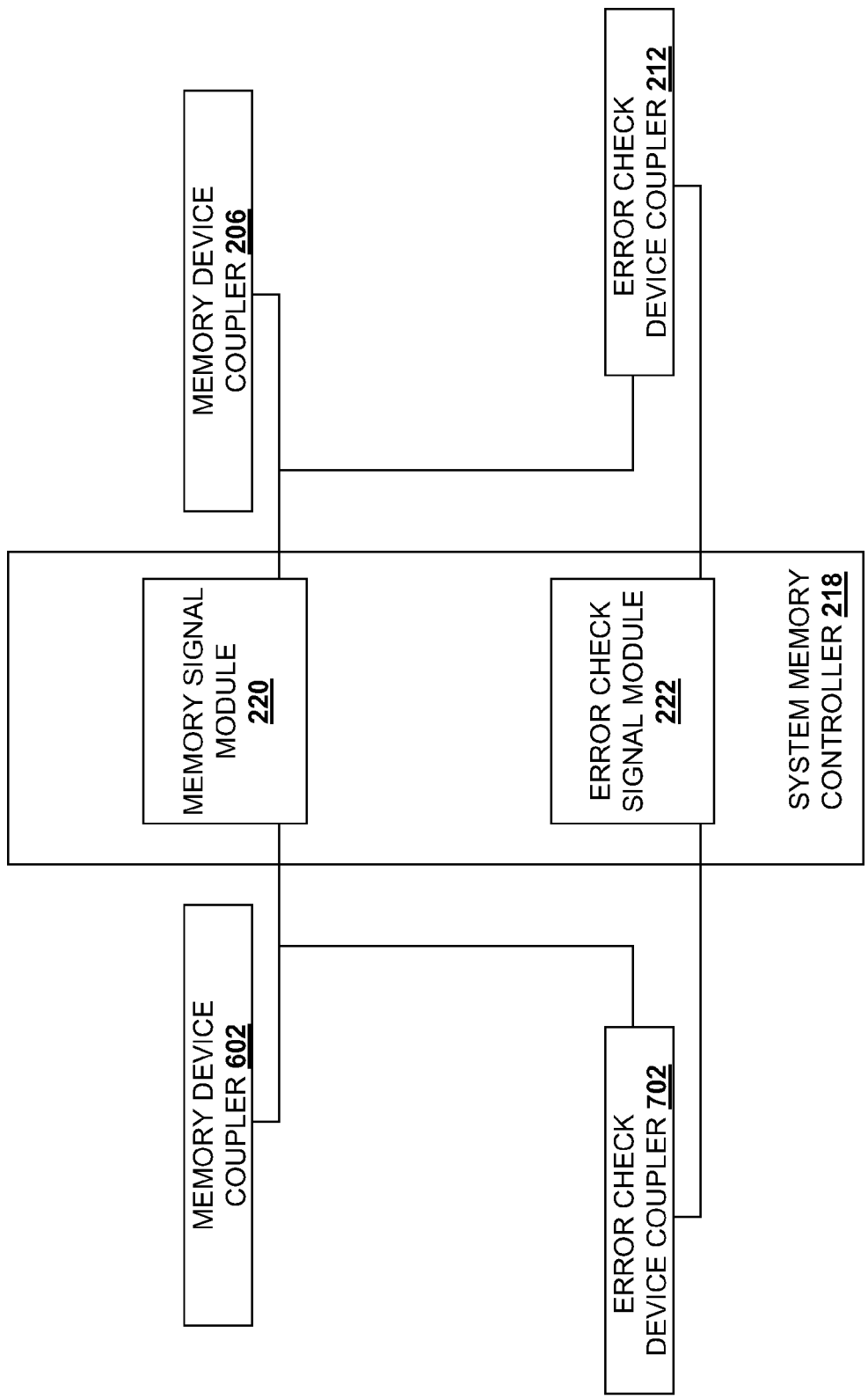
FIG. 7*b* is a schematic view illustrating an embodiment of the IHS of FIG. 7*a*.
Figure 7C:
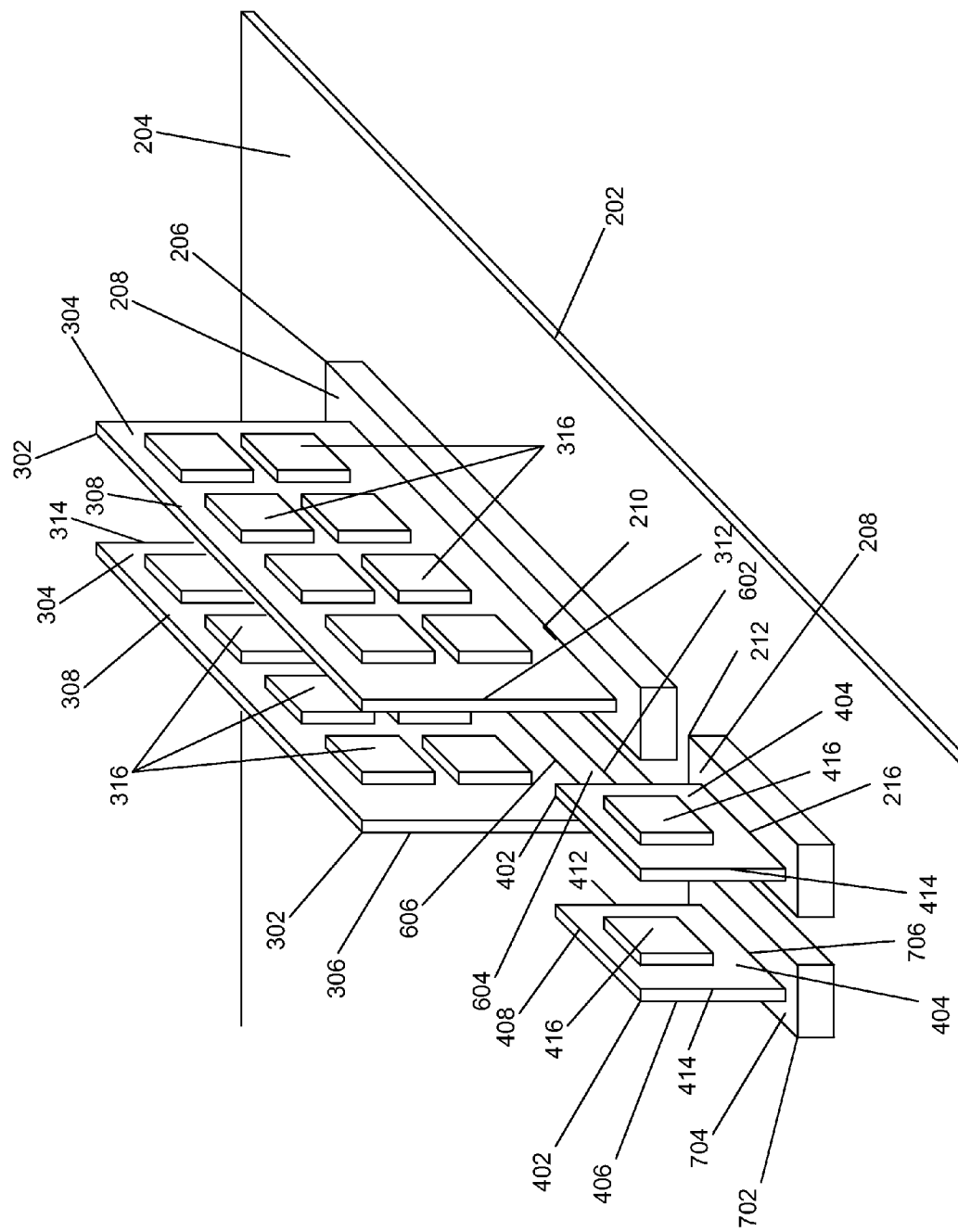
FIG. 7*c* is a perspective view illustrating an embodiment of the memory device of FIG. 3 and the error check device of FIG. 4 coupled to the IHS of FIG. 7*a*.
Figure 7D:
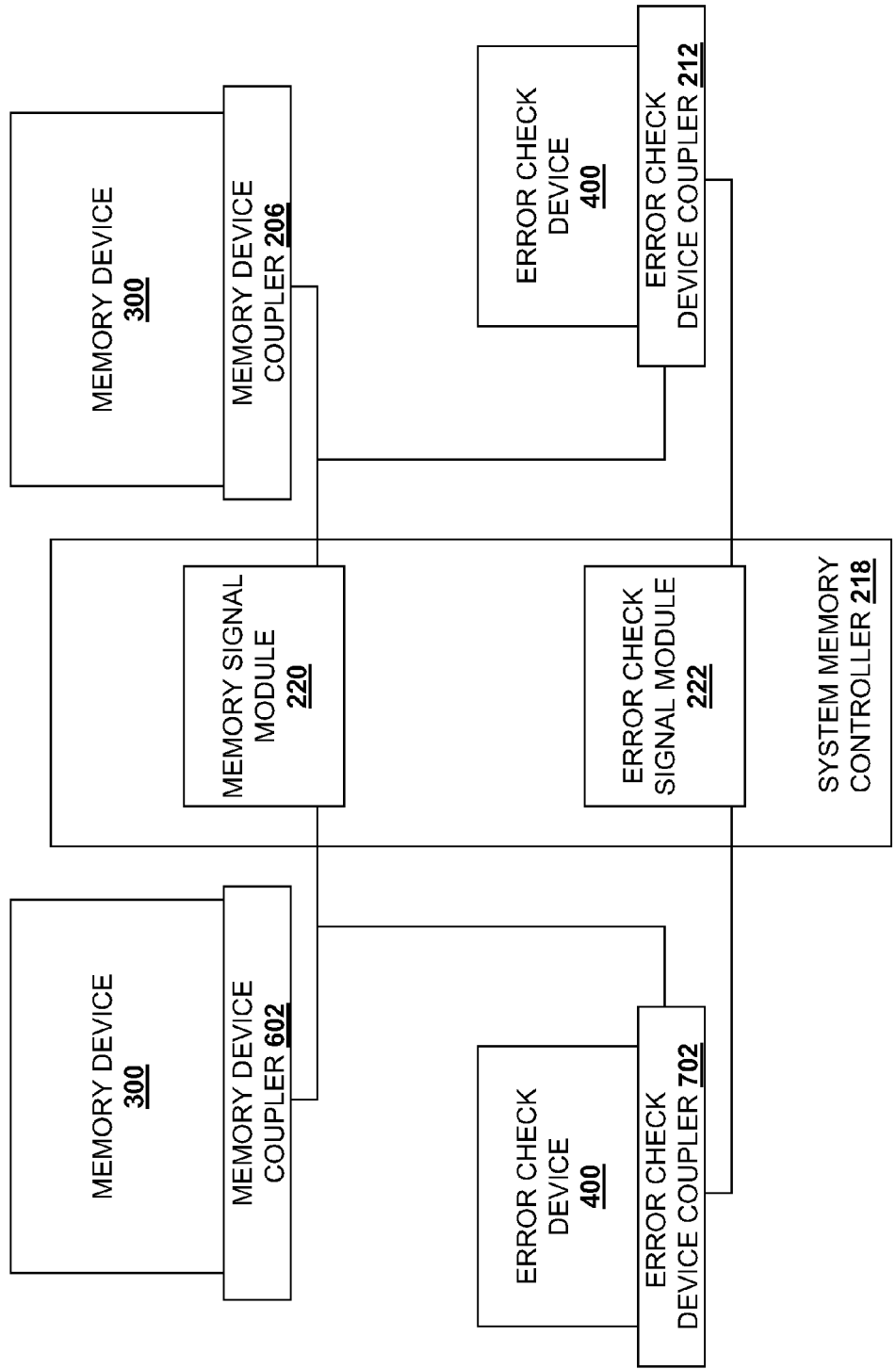
FIG. 7d is a schematic view illustrating an embodiment of the memory device of FIG. 3 and the error check device of FIG. 4 coupled to the IHS of FIG. 7b.

Referring now to FIGS. 5b and 5d, a method 510 for determining a mode of operation for the IHS 200 is illustrated. In an embodiment, the method 510 may occur during block 508 of the method 500. In an embodiment, the method 510 may occur upon initialization of the IHS 200. The method 510 begins at block 510a where a serial presence detect (SPD) is read by the system memory controller 218 from the memory device 300 and the error check device 400. The method 510 then proceeds to decision block 510b where the system memory controller 218 determines if the SPD is returned from the error check device 400. If the SPD is not returned from the error check device 400 at decision block 510b, the method 510 proceeds to block 510c where the IHS 200 operates in a standard mode, with no error checking of data sent to the memory device 300. If the SPD is returned from the error check device 400 at decision block 510b, the method 510a proceeds to decision block 510d where the system memory controller 218 determines if the SPD from the error check device 400 is compatible with from SPD the memory device 300. If the SPDs from the error check device 400 and the memory device 300 are determined to be not compatible at decision block 510d, the method 510 proceeds to block 510c where the IHS operates in the standard mode, described above. If the SPDs from the error check device 400 and the memory device 300 are determined to be compatible at decision block 510d, the method 510 proceeds to block 510e where the IHS 200 operates in an ECC mode, with error checking of data sent to the memory device 300.

While an embodiment using single-bit error checking and correction has been described, one of skill in the art will recognize a variety of error checking and corrections methods that fall within the scope of the present disclosure. Thus, a memory error checking system has been described that provides for optional memory error checking. For example, the IHS 200 may be provided, and if an IHS manufacturer or a user of the IHS decide that the IHS does not need memory error checking, the method 500 may be performed through block 504 and then stopped, providing an IHS with the memory device 300. However, if the IHS manufacturer or user of the IHS decide that the IHS needs memory error checking, the method 500 may be performed through block 506 to provide an IHS with the memory device 300 and the error checking device 400. Upon operation of the IHS, block 508 of the method 500 may be performed to provide memory error checking. The memory error checking system reduces the time and cost required to manufacture IHSs that may or may not include memory error checking by allowing a standard memory device to be used in each IHS, while an error checking device may be added to IHSs that need memory error checking for their memory device(s).

Referring now to FIGS. 6a, 6b, 6c and 6d, an IHS 600 is illustrated that is substantially similar in structure and operation to the IHS 200, described above with reference to FIGS. 2a, 2b, 2c, and 2d with the provision of a memory device coupler 602. The memory device coupler 602 includes a top surface 604 and is mounted to the board 202. A memory device mating slot 606 is defined by the memory device coupler 602 and extends from the top surface 604 of the memory device coupler 602 and into the memory device coupler 602. The memory device coupler 602 includes a plurality of connections (not shown) that are located in the memory device mating slot 606 and may be coupled through the board 202 to a processor such as, for example, the processor 102 described above with reference to FIG. 1. The memory signal module 220 is coupled to the memory device couplers 206 and 602 and to the error check device coupler 212 through, for example, the board 202. The error check signal module 222 is coupled to the error check device coupler 212 through, for example, the board 202. In the embodiment illustrated in FIG. 6b, the memory device coupler 206 and the error check device coupler 212 are coupled to each other and the memory device coupler 602 and the error check device coupler 212 are coupled to each other through, for example, the board 202. In operation, the IHS 600 may operate according to the methods 500 and 510, with memory devices (e.g., the memory device 300) coupled to the memory device couplers 206 and 602 in substantially the same manner as described above with reference block 504 of the method 500. However, at block 508 of the method 500, the system memory controller 218 may use the error check device 400 to perform error checking and correction for each of the memory devices 300 in the memory device couplers 206 and 602. In an embodiment, the coupling between the error check device coupler 212, the system memory controller 218, and the memory device couplers 206 and 602 allows the necessary signals to be routed between the components to allow the system memory controller 218 to use the error check device 400 to perform error checking and correction operations for the multiple memory devices 300 coupled to the memory device couplers 206 and 602. In an embodiment, the error check device 400 includes components such as, for example, additional chips 416 that allow error checking and correction functions for the multiple memory devices 300 coupled to the memory device couplers 206 and 602. While two memory device being error checked using one error check device has been described, any number of memory device couplers may be provided to couple to memory devices such that those memory devices may be error checked using the error check device. In an embodiment, a plurality of error check devices may be provided, each operable to be used to error check a different number of memory devices and each operable to be coupled to the error check device coupler 212. An error check device may then be chosen and coupled to the error check coupler 212 based on the number of memory devices used in the IHS 600 and needing error checking and correction.

Referring now to FIGS. 7a, 7b, 7c and 7d, an IHS 700 is illustrated that is substantially similar in structure and operation to the IHS 600, described above with reference to FIGS. 6a, 6b, 6c and 6d, with the provision of a error check device coupler 702. The error check device coupler 702 includes a top surface 704 and is mounted to the board 202. A error check device mating slot 706 is defined by the error check device coupler 702 and extends from the top surface 704 of the error check device coupler 702 and into the error check device coupler 702. The error check device coupler 702 includes a plurality of connections (not shown) that are located in the error check device mating slot 706 and may be coupled through the board 202 to a processor such as, for example, the processor 102 described above with reference to FIG. 1. The memory signal module 220 is coupled to the memory device couplers 206 and 602 and to the error check device couplers 212 and 702 through, for example, the board 202. The error check signal module 222 is coupled to the error check device couplers 212 and 702 through, for example, the board 202. In the embodiment illustrated in FIG. 7b, the memory device coupler 206 and the error check device coupler 212 are coupled to each other and the memory device coupler 602 and the error check device coupler 702 are coupled to each other through, for example, the board 202. In operation, the IHS 700 may operate according to the methods 500 and 510, with memory devices (e.g., the memory device 300) coupled to the memory device couplers 206 and 602 in substantially the same manner as described above with reference block 504 of the method 500, and error check devices (e.g., the error check device 300) coupled to the error check device couplers 212 and 702 in substantially the same manner as described above with reference block 506 of the method 500. However, at block 508 of the method 500, the error check devices 400 in the error check device couplers 212 and 702 may be used by the system memory controller 218 to perform error checking and correction for each of the memory devices 300 in the memory device couplers 206 and 602, respectively. While two memory device each being error checked using a separate error check device has been described, any number of memory device couplers and error check device couplers may be provided and coupled to memory devices and error check devices such that each memory device may be checked using a separate error check device. In an embodiment, different combinations of the memory device couplers and error check device couplers described above with reference to the IHSs 200, 600 and 700, may be used in an IHS to provide a desired functionality.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A memory error checking system, comprising:
   a controller that is operable to transmit memory signals and error check signals;
   a first memory device coupler that is coupled to the controller and operable to couple to a first memory device, wherein the first memory device coupler is operable to transmit the memory signals from the controller to the first memory device; and
   a first error check device coupler that is coupled to the controller and operable to couple to a first error check device that is separate from the first memory device, wherein the first error check device coupler is operable to transmit the error check signals from the controller to the first error check device to be used to error check the memory signals transmitted to the first memory device.

2. The memory error checking system of claim 1, wherein the first error check device coupler is coupled to the first memory device coupler.

3. The memory error checking system of claim 1, further comprising:
   a second memory device coupler that is coupled to the controller and operable to couple to a second memory device that is separate from the first memory device and the first error check device, wherein the second memory device coupler is operable to transmit the memory signals from the controller to the second memory device.

4. The memory error checking system of claim 3, wherein the first error check device coupler is coupled to the second memory device coupler.

5. The memory error checking system of claim 3, wherein the first error check device coupler is operable to transmit the error check signals from the controller to the first error check device to be used to error check the memory signals transmitted to the second memory device.

6. The memory error checking system of claim 3, further comprising:
   a second error check device coupler that is coupled to the controller and operable to couple to a second error check device that is separate from the first memory device, the second memory device, and the first error check device, wherein the second error check device coupler is operable to transmit the error check signals from the controller to the second error check device to be used to error check the memory signals transmitted to the second memory device.

7. The memory error checking system of claim 6, wherein the second error check device coupler is coupled to the second memory device coupler.

8. The memory error checking system of claim 1, further comprising:
   a memory device that is operable to be coupled to the first memory device coupler.

9. The memory error checking system of claim 1, further comprising:
   an error check device that is operable to be coupled to the first error check device coupler.

10. An information handling system (IHS), comprising:
    a board;
    a processor mounted to the board;
    a controller coupled to the processor and operable to transmit memory signals and error check signals;
    a first memory device coupler that is located on the board, coupled to the controller, and operable to couple to a first memory device, wherein the first memory device coupler is operable to transmit the memory signals from the controller to the first memory device; and
    a first error check device coupler that is located on the board in a spaced apart orientation from the first memory device coupler, coupled to the controller, and operable to couple to a first error check device that is separate from the first memory device, wherein the first error check device coupler is operable to transmit the error check signals from the controller to the first error check device to be used to error check the memory signals transmitted to the first memory device.

11. The IHS of claim 10, wherein the first error check device coupler is coupled to the first memory device coupler.

12. The IHS of claim 10, further comprising:
    a second memory device coupler that is located on the board, coupled to the controller, and operable to couple to a second memory device that is separate from the first memory device and the first error check device, wherein the second memory device coupler is operable to transmit the memory signals from the controller to the second memory device.

13. The IHS of claim 12, wherein the first error check device coupler is coupled to the second memory device coupler.

14. The IHS of claim 12, wherein the first error check device coupler is operable to transmit the error check signals from the controller to the first error check device to be used to error check the memory signals transmitted to the second memory device.

15. The IHS of claim 12, further comprising:
    a second error check device coupler that is located on the board in a spaced apart orientation from the second memory device coupler, coupled to the controller, and operable to couple to a second error check device that is separate from the first memory device, the second memory device, and the first error check device, wherein the second error check device coupler is operable to transmit the error check signals from the controller to the second error check device to be used to error check the memory signals transmitted to the second memory device.

16. The IHS of claim 15, wherein the second error check device coupler is coupled to the second memory device coupler.

17. The IHS of claim 10, further comprising:
    a memory device coupled to the first memory device coupler; and
    an error check device that is separate from the memory device and that is coupled to the first error check device coupler.

18. A method for memory error checking, comprising:
    providing a first memory device coupler and a first error check device coupler that are each coupled to a controller;
    coupling a first memory device to the first memory device coupler, wherein memory signals are transmitted from the controller to the first memory device; and
    coupling a first error check device that is separate from the first memory device to the first error check device coupler, wherein error check signals are transmitted from the controller to the first error check device and used to error check the memory signals transmitted to the first memory device.

19. The method of claim 18, further comprising:
providing a second memory device coupler that is coupled to the controller; and
coupling a second memory device to the second memory device coupler, wherein memory signals are transmitted from the controller to the second memory device, and wherein error check signals are transmitted from the controller to the first error check device and used to error check the memory signals transmitted to the second memory device.

20. The method of claim 18, further comprising:
providing a second memory device coupler and a second error check device coupler that are each coupled to the controller;
coupling a second memory device to the second memory device coupler, wherein memory signals are transmitted from the controller to the second memory device; and
coupling a second error check device that is separate from the second memory device to the second error check device coupler, wherein error check signals are transmitted from the controller to the second error check device and used to error check the memory signals transmitted to the second memory device.

* * * * *